Nov 17, 1970  MINEO NAKANO ET AL  3,541,038
NOVEL POLYIMIDAMIDE RESIN

Filed Sept. 11, 1968  2 Sheets-Sheet 1

INVENTORS
MINEO NAKANO
TAKESHI KOYAMA
BY Craig & Antonelli
ATTORNEYS

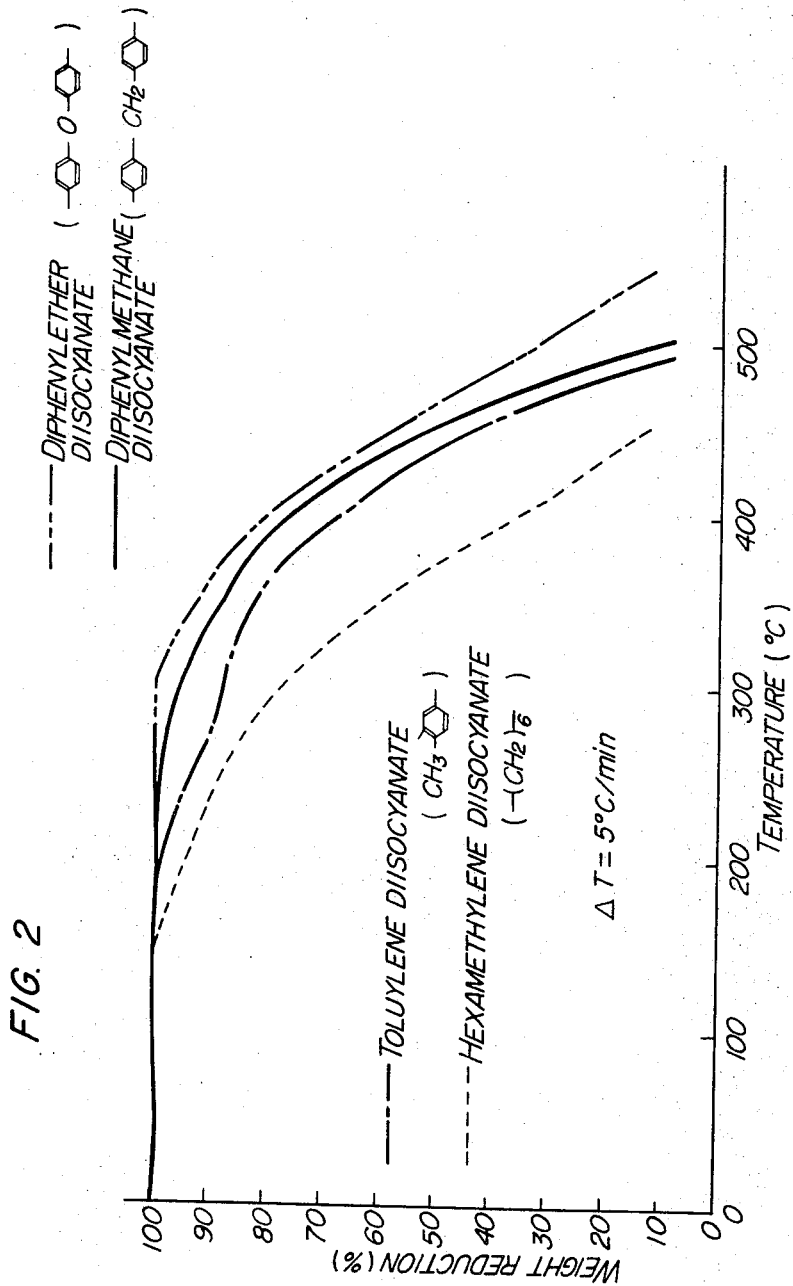

3,541,038
NOVEL POLYIMIDAMIDE RESIN
Mineo Nakano and Takeshi Koyama, Hitachi-shi, Japan, assignors to Hitachi Chemical Company, Ltd., Tokyo, Japan, a corporation of Japan
Continuation-in-part of application Ser. No. 537,388, Mar. 25, 1966. This application Sept. 11, 1968, Ser. No. 759,130
Claims priority, application Japan, Mar. 30, 1965, 40/18,014
Int. Cl. C08g 20/32
U.S. Cl. 260—30.6                                                10 Claims

ABSTRACT OF THE DISCLOSURE

A novel, high molecular weight polyimidamide resin having high thermal resistance and electric insulation is prepared by condensing one mole of a tribasic acid anhydride and 1.00 to 1.06 moles of a diisocyanate compound at a temperature of about 60° to 150° C. in the presence of an inert solvent, while removing the formed carbon dioxide from the reaction system. Said resin is especially useful as coil-impregnation varnishes or electric insulation varnishes. Tough films can be prepared from solutions of the polyimidamide resins.

Figure 1:
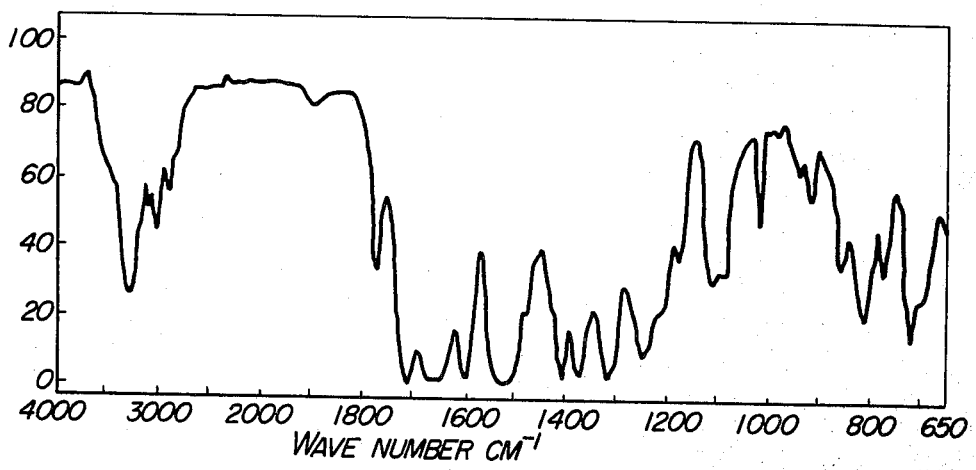

This is a continuation-in-part of application Ser. No. 537,388, filed Mar. 25, 1966, now abandoned.

The present invention relates to a novel polyimidamide resin. More particularly, this invention is concerned with a novel, high molecular weight polyimidamide resin having high thermal resistance and electric insulation prepared by subjecting a tribasic acid anhydride and a diisocyanate compound in substantially equimolar amounts to polycondensation.

U.S. Pat. No. 3,314,923 to Muller et al. discloses the production of polyisocyanates containing imide groups by condensing a monomeric polyisocyanate with a tribasic acid anhydride at a temperature of at least about 50° C. in a proportion of at least 1.1 equivalents of the —NCO group per functional group of the tribasic acid anhydride. However, since the monomeric polyisocyanate is used in stoichiometric excess, the reaction tends to form a gel, and the produced resin has terminal isocyanate groups. Therefore, said resin is not useful as an insulating material for electroconductors though may be used as adhesives or as auxiliary agents for rubbers.

An object of the present invention is to provide a novel, high molecular weight polyimidamide resin having substantially no terminal isocyanate groups and high thermal resistance and electric insulation. Another object of the present invention is to provide an electric insulator obtained by applying the novel polyimidamide resin as such or in the form of a solution in an organic solvent to an electroconductor.

The other objects and advantages of the present invention will be apparent from the following description.

The novel polyimidamide resin of the present invention is prepared by subjecting substantially equimolar amounts of a tribasic acid anhydride and a diisocyanate compound to polycondensation at a temperature of about 60° to 150° C. in the presence of an inert solvent, while removing the formed carbon dioxide from the reaction system. Thus, the novel polyimidamide resin can be prepared in one step without requiring any additional complex purification as in conventional methods and without causing gelation. Further, the time required for the condensation may be short and is ordinarily within 2 to 4 hrs.

The polyimidamide resin of the present invention has substantially no terminal isocyanate groups unlike the resin of U.S. Pat. No. 3,314,923.

The present polyimidamide resin is excellent in thermal resistance and electric insulation because of its having no terminal isocyanate groups unlike the resin of U.S. Pat. No. 3,314,923, and not only is it usable, either as such or in the form of a solution in an organic solvent, as coil-impregnation varnishes or electric insulation varnishes, such as wire enamels and varnish cloths, but its solution can also give films excellent in mechanical strength.

Tribasic acid anhydrides which may be used in the present invention include aromatic, alicyclic and aliphatic tribasic acid anhydrides, such, for example, as trimellitic anhydride, hemimellitic anhydride and aconitic anhydride.

Diisocyanate compounds which may be used in the present invention include aromatic diisocyanate compounds, such as diphenyl oxide diisocyanate, diphenyl methane diisocyanate, tolylene diisocyanate, phenylene diisocyanate, xylylene diisocyanate, diphenyl sulfone diisocyanate, naphthalene diisocyanate and the like; alicyclic diisocyanate compounds, such as cyclohexane diisocyanate, cyclopentane diisocyanate and the like; and aliphatic diisocyanate compounds, such as hexamethylene diisocyanate, tetramethylene diisocyanate and the like. Diphenyl oxide diisocyanate is most preferable.

The superiority of diphenyl oxide diisocyanate to other diisocyanates is clear from Table 1 and FIG. 2 of the attached drawings. FIG. 2 shows the weight reduction, as measured by thermobalance analysis, of various polyimidamide resins having a molar ratio of the diisocyanate to trimellitic anhydride of 1.06.

TABLE 1

| Sample No. | Trimellitic anhydride, mole | Diphenyl-methane diisocyanate, mole | Diphenyl-ether diisocyanate, mole | Non-volatile matter, percent | Viscosity at 30° C., poise | $\eta$ Sp./c. | Baking conditions Temp., °C. | Baking conditions Drawing rate, m./min. | Work-ability | Size, mm. Final outside diameter | Size, mm. Conductor diameter | Size, mm. Film thickness |
|---|---|---|---|---|---|---|---|---|---|---|---|---|
| 1 | 1.0 | | 1.06 | 31.0 | 57 | 0.35 | 320 | 7 | (1) | 1.081 | 1.001 | 0.040 |
|   |     |     |      |      |    |      | 300 | 9 | (1) | 1.082 | 1.002 | 0.040 |
|   |     |     |      |      |    |      | 280 | 11 | (1) | 1.082 | 1.002 | 0.040 |
| 2 | 1.0 | 1.06 | | 30.4 | 59.2 | 0.35 | 320 | 7 | (1) | 1.074 | 1.000 | 0.037 |
|   |     |      |   |      |      |      | 300 | 9 | (1) | 1.078 | 1.000 | 0.039 |
|   |     |      |   |      |      |      | 280 | 11 | (1) | 1.080 | 1.000 | 0.040 |

| Sample No. | Flexibility Normal state x1 | x2 | x3 | x4 | Degradation at 200° C. for 24 hrs. x1 | x2 | x3 | x4 | Degradation at 250° C. for 24 hrs. x1 | x2 | x3 | x4 | Thermal shock resistance at 350° C. for 1 hr. x1 | x2 | x3 | x4 |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
|   | 0 | 0 | 0 | 0 | 0 | 0 | 0 | 0 | (1)1 | 0 | 0 | 0 | 1 | 0 | 0 | 0 |
|   | 0 | 0 | 0 | 0 | 0 | 0 | 0 | 0 | (2)2 | (2)2 | 0 | 0 | 0 | 0 | 0 | 0 |
| 2 | 0 | 0 | 0 | 0 | 0 | 0 | 0 | 0 | (2) | (2) | (2) | (2) | 1 | 0 | 0 | 0 |
|   | 0 | 0 | 0 | 0 | 0 | 0 | 0 | 0 | (2) | (2) | (2) | (2) | 0 | 0 | 0 | 0 |
|   | 0 | 0 | 0 | 0 | 0 | 0 | 0 | 0 | (2) | (2) | (2) | (2) | 0 | 0 | 0 | 0 |

Footnotes at end of table.

TABLE 1—Continued

| Sample No. | Thermoplastic flow at 350° C. for 6 hrs., weight, 700 g. | Abrasion resistance 600 g., times— | | | Twist resistance, times | Breakdown voltage | | Chemical resistance | | | |
|---|---|---|---|---|---|---|---|---|---|---|---|
| | | Max. | Min. | x | | Kv. | Kv./0.1 mm. | Benzene | NaOH, 10% | $H_2SO_4$ | Toluene-ethanol |
| 1 | OK | 2,270 | 137 | 1,053 | 81 | 11.1 | 13.9 | 7H | 6H | 7H | 7H |
| | OK | 4,905 | 779 | 2,352 | 82 | 11.4 | 14.2 | 7H | 6H | 7H | 7H |
| | OK | 2,462 | 742 | 1,728 | 79 | 10.9 | 13.6 | 7H | 6H | 7H | 7H |
| 2 | OK | 601 | 337 | 472 | 74 | 12.8 | 17.3 | 6H | 7H | 6H | 7H |
| | OK | 1,259 | 203 | 639 | 81 | 12.4 | 15.9 | 6H | 7H | 6H | 7H |
| | 7' | 653 | 324 | 502 | 83 | 13.9 | 17.4 | 6H | 6H | 6H | 7H |

¹ Good.   ² Peeled.

NOTE.—The polymer used was prepared by charging 0.100 mole of trimellitic anhydride in 130 g. of N-methyl-2-pyrrolidone and then 0.106 mole of a diisocyanate with stirring into a 300 ml., four-necked flask with a calcium chloride-packed tube, thereafter elevating the temperature to 60° C., stirring the mixture at said temperature for 30 min., further elevating the temperature to 120-130° C., and effecting the reaction at said temperature for about 3 hrs.

As the inert solvents, there may be used dimethylacetamide, dimethylformamide, N-methyl-2-pyrrolidone, hexamethyl phosphoramide and the like, among which N-methyl-2-pyrrolidone is most preferred.

Although the tribasic acid anhydride and the diisocyanate compound are condensed by heating them in the presence of an inert solvent, the carbon dioxide formed during the reaction should be removed as much as possible from the reaction system, because when the carbon dioxide bubbles are left unremoved, undesirable effects are brought about in view of the characteristics of the resulting resin when used for the desired application. The time for the condensation reaction of the tribasic acid anhydride and the diisocyanate compound is not particularly critical or restricted so far as a required and sufficient time is employed to complete the reaction. The condensation reaction temperature is within the range of from 60° to 150° C.

In the present invention, the amount of the tribasic acid anhydride and that of the diisocyanate compound must be substantially equimolar to each other, preferably in a proportion of 1.00 to 1.06 moles of the diisocyanate compound per mole of the tribasic acid anhydride. When the diisocyanate compound is used in an amount of at least 1.1 moles per mole of the tribasic acid anhydride, the reaction becomes very difficult owing to a rapid increase in viscosity or to gelation, which requires addition of a further solvent, whereby only a low resin concentration varnish is produced which is very unsuitable for the formation of an enameled wire. Further, when the diisocyanate compound is used in an amount of at least 1.1 moles per mole of the tribasic anhydride, the produced varnish is much inferior to the present resin varnish in storage stability, workability in baking enameled wire and the characteristics of enameled wire.

The following examples further illustrate the present invention.

EXAMPLE 1

To a 500 ml., three-necked flask equipped with a stirrer, a thermometer and a cooling pipe were added 50 g. of diphenylmethane diisocyanate and 100 ml. of dimethylacetamide. To the flask was further added a solution of 37 g. of trimellitic anhydride (the molar ratio of the diisocyanate to the anhydride is 1.04) in 100 ml. of dimethylacetamide. When the temperature was elevated to between 80° C. and 100° C., a vigorous reaction occured and the generation of carbon dioxide was observed.

The temperature was further elevated, and at a temperature of 120° C. to 150° C., stirring was effected for about one hour, whereby the color of the solution changed from colorless to yellow and further to red, and the viscosity of the solution greatly increased. The heating was further continued for about two hours, and then the reaction was terminated. The resulting polyimidamide resin has an intrinsic viscosity of 0.92 as measured in dimethylformamide at 25° C. The melting point of the resin was above 320° C., and the weight loss thereof due to heating in air at 250° C. for three days was 1%.

The infra-red absorption spectrum of the resin is shown in FIG. 1. In the infra-red absorption spectrum, absorption due to amide linkages is seen at 3300 cm.$^{-1}$, 1660 cm.$^{-1}$ and 1530 cm.$^{-1}$, and the characteristic absorption of the cyclic imide carbonyl radical is observed at 1776 cm.$^{-1}$ and 721 cm.$^{-1}$. In view of the above fact, it is confirmed that the resin produced is a polyimidamide resin.

The resin solution obtained was poured in a thickness of 0.5 mm. onto a plate and then heated at 120° C. and 150° C. each for about 30 min. to obtain a tough film.

EXAMPLE 2

To a 500 ml., four-necked flask equipped with a stirrer, a nitrogen gas-introducing pipe, a thermometer and a cooling pipe were added 50 g. of diphenyl oxide diisocyanate and 100 ml. of dimethylacetamide. To the flask was further added at one time a solution of 38 g. of trimellitic anhydride (the molar ratio of the diisocyanate to the anhydride is 1.00) in 100 ml. of dimethylacetamide. When the temperature was elevated to about 90° C., the generation of carbon dioxide was observed, and the color of the solution became yellow. The solution was further heated at 150° C. for 1 to 2 hrs., whereby the color of the solution became deep red and the viscosity thereof greatly increased. The heating was continued for about 3 hrs. and the reaction was then terminated.

The resulting resin had an intrinsic viscosity of 0.45 as measured in dimethylformamide at 25° C. The resin solution obtained was poured in a thickness of 0.5 mm. onto a plate and then heated at 120° C. and 150° C. each for about 30 min. to obtain a tough film.

EXAMPLE 3

To a 500 ml., four-necked flask equipped with a stirrer, a nitrogen gas-introducing pipe, a thermometer and a cooling pipe were aded 50 g. of diphenylmethane diisocyanate and 100 ml. of dimethylacetamide. To the flask was further added a solution of 37 g. of trimellitic anhydride (the molar ratio of the diisocyanate to the anhydride is 1.04) in 100 ml. of dimethylacetamide. When the flask was heated to 80° C.–100° C., a vigorous de-carbon dioxidation reaction was caused and the generation of carbon dioxide was observed.

The temperature was further elevated, and at 130° C.–150° C., stirring was effected for about 3 hrs., whereby the color of the solution changed from colorless to yellow and further to red, and the viscosity thereof greatly increased. At this time, the reaction was ceased.

The resulting polyimidamide resin was diluted with dimethylacetamide to a non-volatile content of 20% and a viscosity of 10 poises (at 25° C., BL type). Thereafter, the resin was applied to a 1.0 mm. diameter, soft copper wire and baked thereon under the following conditions to form a 0.035 mm. thick film:

Number of times of application: 7
Drawing rate: 5 m./min.
Baking temperature of funnel:
  At top of funnel: 400° C.
  At center of funnel: 250° C.
  At entrance of funnel: 100° C.

The characteristics of the thus obtained insulated electric wire were as follows: Winding test (the coated wire was wound around a wire having the same diameter) (after heating at 220° C. for 6 hrs.) according to Japanese Industrial Standard C–3203–1957 was good; thermal shock resistance (at 250° C. for 1 hr., the coated wire was wound around a wire having the same diameter) was extremely high; abrasion resistance was 218 times (load: 700 g.); breakdown voltage was 8.9 kv. (after heating at 220° C. for 24 hrs.) and resistance to monochloro-difluoromethane was very high.

EXAMPLE 4

Into a 3 liter, four-necked flask equipped with a calcium chloride-packed tube were charged 384 g. (2.00 moles) of trimellitic anhydride and 2 kg. of N-methyl-2-pyrrolidone, and 530 g. (2.12 moles) of diphenylmethane diisocyanate was then stirred into the flask. The resulting mixture was heated, while being stirred, to a temperature of 120° C. to 130° C., during which a violent de-carbon dioxidation reaction took place. After 1.5 hrs. at said temperature, the mixture began to show a viscosity. In about 4 hrs. from this point, the viscosity of the reaction product became substantially constant and the generating rate of carbon dioxide became very small. This point was decided to be the end of the reaction. The resulting resin solution had a Gardner viscosity of 70 poises at 25° C. and a resin content of 31%.

For comparison, the same procedure was repeated by use of molar ratios of the diisocyanate to the anhydride of 1.12 and 1.15. When the ratio was 1.15, gelation was caused, and when the ratio was 1.12, gelation was not caused but the viscosity increase during reaction was very rapid, and hence the progress of reaction became very difficult.

Further, the viscosity of the varnish obtained by use of a molar ratio of the diisocyanate to the anhydride of 1.06 did not change at all with the lapse of time at both room temperature and 50° C., while the viscosities of the varnishes obtained by use of the other ratios decreased rapidly with the lapse of time at both of said temperatures.

EXAMPLE 5

The three varnishes obtained in Example 6 were applied to 1.0 mm. diameter, soft copper wire and baked thereon as in Example 5 to obtain the results shown in Tables 2 and 3.

TABLE 2

| | Varnish No. | | |
|---|---|---|---|
| | 1 | 2 | 3 |
| Molar ratio of diisocyanate to anhydride | 1.15 | 1.12 | 1.06 |
| Resin content, percent | 24.6 | 25.0 | 30.5 |
| Viscosity at 30° C., poises | 97 | 43.5 | 70 |
| Number of times of application | 9 | 9 | 8 |
| Drawing rate (m./min.) in baking and appearance: | | | |
| 7.5 | ⊚ | ⊚ | ⊚ |
| 8 | ⊚ | ⊚ | ⊚ |
| 8.5 | o | ⊚ | ⊚ |
| 9 | x | ⊚ | ⊚ |
| 9.5 | | o | ⊚ |
| 10 | | x | ⊚ |
| 10.5 | | | ⊚ |
| 11.5 | | | ⊚ |
| 12.5 | | | ⊚ |
| 13.5 | | | ⊚ |
| 15 | | | ⊚ |

TABLE 3

| | Varnish No. | | | | | | | | |
|---|---|---|---|---|---|---|---|---|---|
| | 1 | | | 2 | | | 3 | | |
| Drawing rate, m./min | 7.5 | 8.5 | 7.5 | 8.5 | 9.5 | 7.5 | 9.5 | 11.5 | 13.5 |
| Thickness of film, mm | 0.027 | 0.038 | 0.038 | 0.039 | 0.039 | 0.038 | 0.038 | 0.039 | 0.040 |
| Flexibility: | | | | | | | | | |
| Normal state, x1 | 0 | 0 | 0 | 0 | 0 | 0 | 0 | 0 | 0 |
| After 30% stretching: | | | | | | | | | |
| x1 | (5)5 | (5)5 | (5)5 | (5)5 | (5)5 | (5)5 | (5)5 | 0 | 0 |
| x2 | (5)5 | (3)3 | (5)5 | (5)5 | (1)1 | (5)5 | 0 | 0 | 0 |
| x3 | 0 | 0 | (2)3 | 0 | 0 | 0 | 0 | 0 | 0 |
| x4 | 0 | 0 | 1 | 0 | 0 | 0 | 0 | 0 | 0 |
| After heat degradation, 225° C., 6 hrs.: | | | | | | | | | |
| x1 | (¹) | (3)3 | (¹) | (1)1 | 0 | (¹) | 2 | 0 | 0 |
| x2 | 0 | 0 | (2)4 | 0 | 0 | (1)3 | 1 | 0 | 0 |
| x3 | 0 | 0 | 0 | 0 | 0 | 0 | 0 | 0 | 0 |
| x4 | 0 | 0 | 0 | 0 | 0 | 0 | 0 | 0 | 0 |
| After heat degradation, 200° C., 24 hrs.: | | | | | | | | | |
| x1 | (¹) | (3)3 | (2)2 | (1)1 | 1 | 0 | 0 | 0 | 0 |
| x2 | 0 | 0 | 1 | (1)1 | 1 | 0 | 0 | 0 | 0 |
| x3 | 0 | 0 | 0 | 0 | 0 | 0 | 0 | 0 | 0 |
| x4 | 0 | 0 | 0 | 0 | 0 | 0 | 0 | 0 | 0 |
| Thermal shock resistance, 350° C., 2 hrs.: | | | | | | | | | |
| x1 | 0 | 2 | 2 | 1 | 1 | 1 | 0 | 0 | 0 |
| x2 | 0 | 0 | 1 | 0 | 0 | 0 | 0 | 0 | 0 |
| x3 | 0 | 0 | 0 | 0 | 0 | 0 | 0 | 0 | 0 |
| x4 | 0 | 0 | 0 | 0 | 0 | 0 | 0 | 0 | 0 |
| Abrasion resistance, times | 379 | 464 | 384 | 676 | 481 | 310 | 375 | 290 | 293 |
| Twist resistance, times | 67 | 67 | 66 | 70 | 67 | 64 | 72 | 72 | 83 |
| Thermoplastic flow, 350° C., 6 hrs | Δ | x | o | Δ | Δ | o | o | o | o |
| Breakdown voltage, kv | 13.8 | 12.5 | 11.3 | 12.0 | 11.5 | 14.9 | 15.2 | 16.2 | 16.0 |
| Chemical resistance: | | | | | | | | | |
| Benzene | 7H | 7H | 7H | 7H | 6H | 7H | 7H | 7H | 7H |
| Caustic soda | 6H | 6H | 6H | 6H | 6H | 7H | 7H | 6H | 6H |
| Sulfuric acid | 6H | 6H | 6H | 6H | 6H | 7H | 7H | 7H | 7H |
| Toluene-ethanol | 6H | 6H | 7H | 7H | 7H | 7H | 7H | 7H | 7H |

¹ Peeled.

NOTES:
1. The flexibility and the thermal shock resistance are expressed by the number of coils in which pin holes were formed when five sample coils were subjected to test. The figure in parentheses refers to the number of coils having cracks confirmed with the naked eye.
2. The thermoplastic flow was determined by elevating the temperature at a rate of 300° C./2 hrs. and maintaining at 350° C. for 6 hrs. o refers to OK for 6 hrs., Δ to flow within 6 hrs. at 350° C. and x to flow during the temperature elevation.

As seen from Table 2, when the ratio is 1.15, the drawing rate must be lower than 8 m./min. to obtain good appearance of baked enameled wire, while when the ratio is 1.06, a drawing rate of 15 m./min. can be used to obtain good appearance. Further, it should be noted that when the ratio is 1.06 a varnish having a high resin content is obtained, and hence 8 times of application is sufficient as compared with 9 times of application of the other varnishes.

Table 3 clearly shows that Varnish No. 3 is superior to the others in flexibility, particularly after heat-degradation, and thermoplastic flow.

We claim:

1. A high molecular weight polyimidamide resin having high thermal resistance and electric insulation prepared by subjecting a tribasic acid anhydride and 1.00 to 1.06 moles, per mole of the anhydride, of an organic diisocyanate compound to polycondensation at a temperature of about 60° C. to 150° C. in the presence of an inert solvent.

2. A high molecular weight polyimidamide resin according to claim 1, wherein the tribasic acid anhydride is trimellitic anhydride.

3. A high molecular weight polyimidamide resin according to claim 1, wherein the organic diisocyanate compound is diphenyl oxide diisocyanate.

4. A high molecular weight polyimidamide resin according to claim 1, wherein the organic diisocyanate compound is diphenylmethane diisocyanate.

5. A high molecular weight polyimidamide resin according to claim 1, wherein the inert solvent is N-methyl-2-pyrrolidone.

6. An electroconductor having a polyimidamide insulating resin coated thereon, said resin being prepared by subjecting a tribasic acid anhydride and 1.00 to 1.06 moles, per mole of the anhydride, of an organic diisocyanate compound to polycondensation at a temperature of about 60° C. to 150° C. in the presence of an inert solvent.

7. An electroconductor having an insulating polyimidamide resin solution coated thereon, said resin solution being prepared by subjecting a tribasic acid anhydride and 1.00 to 1.06 moles, per mole of the anhydride, of an organic diisocyanate compound to polycondensation at a temperature of about 60° C. to 150° C. in the presence of an inert solvent, and then dissolving the resulting high molecular weight resin in an organic solvent.

8. A coating composition comprising a polyimidamide resin dissolved in an organic solvent, said polyimidamide resin being prepared by subjecting a tribasic acid anhydride and 1.00 to 1.06 moles, per mole of the anhydride, of an organic diisocyanate compound to polycondensation at a temperature of about 60° C. to 150° C. in the presence of an inert solvent.

9. A coating composition in accordance with claim 8, wherein said organic solvent is selected from the group consisting of dimethylacetamide, dimethylformamide, N-methyl-2-pyrrolidone, hexamethyl phosphoramide and mixtures thereof.

10. A high molecular weight polyimidamide resin having high thermal resistance and electric insulation prepared by subjecting equimolar amounts of a tribasic acid anhydride and an organic diisocyanate compound to polycondensation at a temperature of about 60° C. to 150° C. in the presence of an inert solvent.

References Cited
UNITED STATES PATENTS

| | | | |
|---|---|---|---|
| 3,260,691 | 7/1966 | Lavin et al. | 260—30.2 |
| 3,300,420 | 1/1967 | Frey | 260—2.5 |
| 3,314,923 | 4/1967 | Muller et al. | 260—78 |
| 3,347,828 | 10/1967 | Stephens et al. | 260—47 |

WILLIAM H. SHORT, Primary Examiner

L. L. LEE, Assistant Examiner

U.S. Cl. X.R.

117—128.4, 161, 232; 260—32.4, 32.6, 47, 77.5